US012023923B2

(12) United States Patent
Hur et al.

(10) Patent No.: US 12,023,923 B2
(45) Date of Patent: Jul. 2, 2024

(54) DROPLET EJECTION APPARATUS AND DROPLET EJECTION METHOD USING THE SAME

(71) Applicant: Korea Institute of Machinery & Materials, Daejeon (KR)

(72) Inventors: Shin Hur, Sejong (KR); Duck Gyu Lee, Daejeon (KR); Bo-Yeon Lee, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 123 days.

(21) Appl. No.: 17/632,031

(22) PCT Filed: Dec. 9, 2020

(86) PCT No.: PCT/KR2020/017987

§ 371 (c)(1),
(2) Date: Feb. 1, 2022

(87) PCT Pub. No.: WO2021/125687

PCT Pub. Date: Jun. 24, 2021

(65) Prior Publication Data

US 2022/0274403 A1 Sep. 1, 2022

(30) Foreign Application Priority Data

Dec. 20, 2019 (KR) ........................ 10-2019-0171632

(51) Int. Cl.
*B41J 2/14* (2006.01)
*B41J 2/04* (2006.01)

(52) U.S. Cl.
CPC ....... *B41J 2/14008* (2013.01); *B41J 2/14088* (2013.01); *B41J 2/14201* (2013.01); *B41J 2/04* (2013.01)

(58) Field of Classification Search
CPC ............... B41J 2/14008; B41J 2/14088; B41J 2/14201; B41J 2/04; B41J 2/04575
See application file for complete search history.

(56) References Cited

U.S. PATENT DOCUMENTS 6,154,235 A * 11/2000 Fukumoto .................. B41J 2/14 347/46
6,598,958 B2 * 7/2003 Aizawa ................ B41J 2/14008 347/46
(Continued)

FOREIGN PATENT DOCUMENTS

JP H09-057963 A 3/1997
JP 2011-201169 A 10/2011
(Continued)

OTHER PUBLICATIONS

International Search Report for International Application No. PCT/KR2020/017987 dated Mar. 5, 2021.

*Primary Examiner* — Geoffrey S Mruk
(74) *Attorney, Agent, or Firm* — HARNESS, DICKEY & PIERCE, P.L.C.

(57) ABSTRACT

In a droplet ejection apparatus and a droplet ejection method using the droplet ejection apparatus, the droplet ejection apparatus includes a liquid supply unit, a nozzle and a standing wave generating unit. The liquid supply unit is configured to provide a pressure to a liquid. The nozzle is connected to the liquid supply unit through a connecting conduit, to eject the liquid with a droplet. The standing wave generating unit is configured to generate a standing wave around the nozzle at which the droplet is formed, to detach the droplet from the nozzle.

13 Claims, 7 Drawing Sheets

(56) References Cited

U.S. PATENT DOCUMENTS

| | | | | |
|---|---|---|---|---|
| 6,692,106 | B2 * | 2/2004 | Aizawa | B41J 2/14008 347/50 |
| 9,878,536 | B2 * | 1/2018 | Foresti | B41J 2/14008 |
| 11,498,332 | B2 * | 11/2022 | Foresti | A61L 27/24 |

FOREIGN PATENT DOCUMENTS

| | | | |
|---|---|---|---|
| JP | 2012-113137 | A | 6/2012 |
| KR | 101087315 | B1 | 11/2004 |
| KR | 10-2011-0125739 | A | 11/2011 |
| KR | 102161544 | B1 | 10/2020 |
| WO | WO-2019-011674 | A1 | 1/2019 |

* cited by examiner

DROPLET EJECTION APPARATUS AND DROPLET EJECTION METHOD USING THE SAME

CROSS-REFERENCE TO RELATED APPLICATIONS

This application is a national phase under 35 U.S.C. § 371 of PCT International Application No. PCT/KR2020/017987 which has an International filing date of Dec. 9, 2020, which claims priority to Korean Patent Application No. 10-2019-0171632, filed Dec. 20, 2019, the entire contents of each of which are hereby incorporated by reference.

BACKGROUND

1. Field of Disclosure

The present disclosure of invention relates to a droplet ejection apparatus and a droplet ejection method using the droplet ejection apparatus, and more specifically the present disclosure of invention relates to a droplet ejection apparatus and a droplet ejection method using the droplet ejection apparatus, capable of ejecting a high viscous printing liquid precisely in an inkjet printing process.

2. Description of Related Technology

Generally, in an inkjet printing, a pressure wave is formed in a nozzle using an ink liquid supply device such as a syringe pump, and an ink liquid is ejected with a droplet based on a dynamic ejection principle using the pressure wave, and then the printing is performed.

However, for ejecting the droplet of the ink liquid to be a predetermined size or velocity, a pressure of the ink liquid supply device should be controlled precisely and accurately.

As illustrated in FIG. 1, when the droplet is formed at a nozzle tip of the nozzle 3 according to the pressure provided by the ink liquid supply device 1, the droplet W keeps hanging at the nozzle tip without being detached from the nozzle tip due to a capillary force Fc formed by a surface tension of a hole of the nozzle 3. Then, as the pressure from the ink liquid supply device 1 increases, the size of the droplet W increases and then the droplet W is detached from the nozzle 3 and is ejected at the time when a gravity Fg of the droplet W becomes larger than the capillary force Fc.

Here, as the pressure from the ink liquid supply device increases more, the droplet may be ejected continuously, but quality of the printing may decreased. Thus, the droplet ejection apparatus in the conventional inkjet printing is normally limited to be applied to the ink liquid having a relatively lower viscosity less than 10 times of the viscosity of water.

Further, in recently notices technical fields such as a nano process and a 3D printing, a fine material manufacturing and printing technology, in which a fine material manufactured using various kinds of high viscous liquids such as a metal material, a bio material, a polymer and so on is used, is widely applied, and thus a precise and accurate control for the size, the time and the speed of the droplet ejection is necessary to maintain or to increase the printing quality.

Thus, more advanced high technology in the droplet ejection apparatus is necessary to eject the droplet of the liquid having a relatively high viscosity in a range between 10 times and 10,000 times of the viscosity of water.

Related prior art is Korean patent No. 10-1087315.

SUMMARY

The present invention is developed to solve the above-mentioned problems of the related arts. The present invention provides a droplet ejection apparatus capable of ejecting a high viscous liquid from a nozzle precisely using an acoustic pressure force of a standing wave.

In addition, the present invention also provides a droplet ejection method using the droplet ejection apparatus.

According to an example embodiment, the droplet ejection apparatus includes a liquid supply unit, a nozzle and a standing wave generating unit. The liquid supply unit is configured to provide a pressure to a liquid. The nozzle is connected to the liquid supply unit through a connecting conduit, to eject the liquid with a droplet. The standing wave generating unit is configured to generate a standing wave around the nozzle at which the droplet is formed, to detach the droplet from the nozzle.

In an example, the standing wave generating unit may include a first standing wave generating part and a second standing wave generating part. The first standing wave generating part may cover at least a partial portion of the nozzle, to form a first standing wave area in which a first standing wave is formed. The second standing wave generating part may be connected to the first standing wave generating part, and may be configured to amplify the first standing wave generated from the first standing wave generating part, to form a second standing wave area in which a second standing wave is formed.

In an example, a nozzle tip of the nozzle may be disposed in the second standing wave area.

In an example, the nozzle tip may be disposed at a position substantially same position at which a peak having a maximum acoustic pressure force of the second standing wave is formed.

In an example, the standing wave generating unit may further include a controller configured to control the first standing wave generating part so as for the peak having the maximum acoustic pressure force of the second standing wave to be disposed at the same position of the nozzle tip, when a predetermined size of droplet is formed at the nozzle.

In an example, the first standing wave generating part may include a first standing wave chamber configured to form the first standing wave area, an acoustic wave generating part configured to generate an acoustic wave to be dissipated into the first standing wave area, and an acoustic wave reflecting part spaced apart from the acoustic wave generating part by a first distance, to reflect the acoustic wave dissipated from the acoustic wave generating part.

In an example, the first standing wave chamber may have a square pillar shape.

In an example, the first distance may be an integer multiple of a half wavelength 212 of the acoustic wave.

In an example, the second standing wave generating part may include a tunnel formed through the first standing wave chamber, to have a natural frequency equal to a frequency of the first standing wave.

In an example, the second standing wave generating part may include a tunnel formed through the first standing wave chamber. The tunnel may include a first tunnel having a first diameter and connected to the first standing wave area, and a second tunnel having a second diameter smaller than the first diameter and connected to the first tunnel. The first tunnel and the second tunnel may be alternately disposed with each other.

In an example, at least one of the nozzle and the standing wave generating unit may be a plural with keeping a predetermined distance.

In an example, the liquid supply unit may be configured to supply the liquid toward each of the nozzles with the same pressure or to supply the liquid toward the nozzles with the pressures different from each other respectively, when the nozzle is the plural.

In an example, the droplet ejection apparatus may include a heater configured to heat the nozzle so as to decrease viscosity of the liquid passing through the nozzle.

According to another example embodiment, the droplet ejection method includes a droplet forming step and a droplet detaching step. In the droplet forming step, the liquid is pressurized by the liquid supply unit and the droplet is formed at the nozzle. In the droplet detaching step, the droplet is detached from the nozzle using an acoustic pressure force of the standing wave generating by the standing wave generating unit.

In an example, in the droplet detaching step, the standing wave generating unit may be controlled such that a peak having a maximum acoustic pressure force of the standing wave may be formed at the same position with a nozzle tip, when a predetermined size of droplet is formed at the nozzle.

According to the present example embodiments, the standing wave is formed around the nozzle and the acoustic pressure force of the standing wave is used, so that the liquid having the high viscosity may be detached and ejected effectively.

In addition, the acoustic pressure force of the standing wave is properly controlled and the amplified acoustic pressure force is provided, so that the size, the start and the velocity of the ejection of the droplet may be precisely controlled or determined. Thus, the printing quality may be more increased.

REFERENCE NUMERALS

Figure 1:
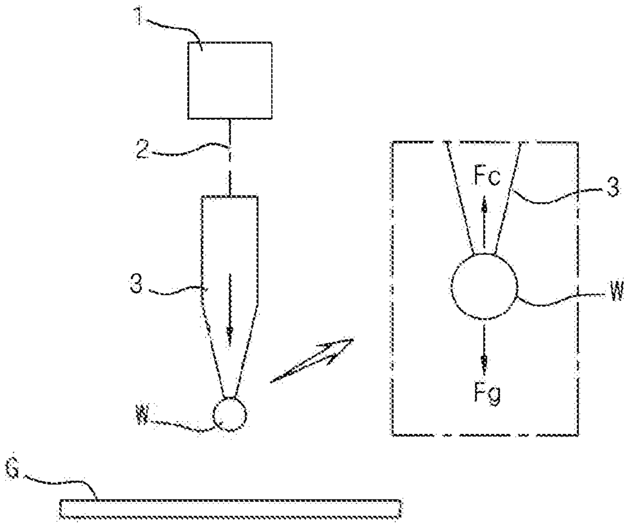
FIG. 1 Prior Art
FIG. 1 is a conceptual view illustrating an ejecting process of a droplet from a nozzle, in the conventional technology.

1, 2, 3: droplet ejection apparatus
100: liquid supply unit
200: nozzle
300: standing wave generating unit
310: first standing wave generating part
330: second standing wave generating part

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

Figure 2A:
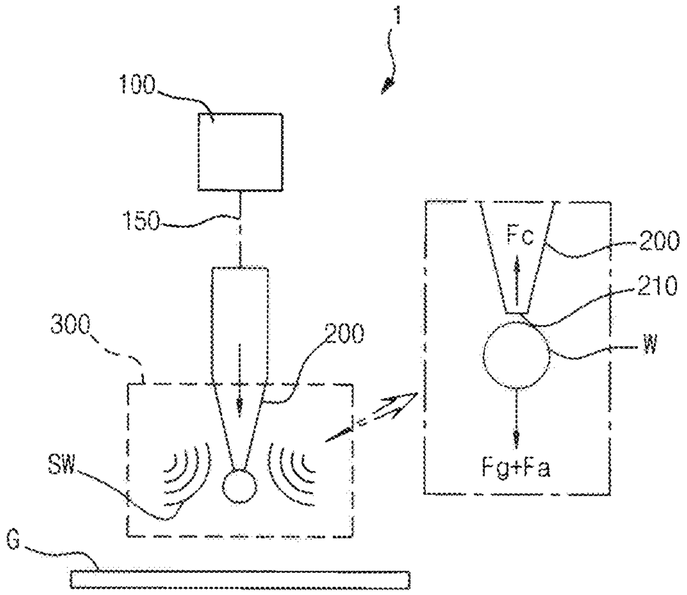
FIG. 2A and FIG. 2B are conceptual views illustrating the ejecting process of the droplet, in a droplet ejection apparatus of an example embodiment of the present invention.
Figure 2B:
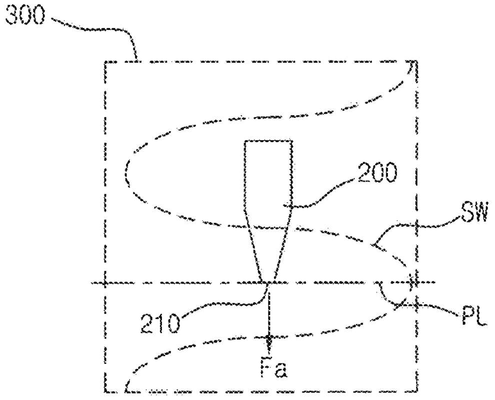

FIG. 2A and FIG. 2B are conceptual views illustrating the ejecting process of the droplet, in a droplet ejection apparatus of an example embodiment of the present invention.

Referring to FIG. 2A and FIG. 2B, the droplet ejection apparatus according to the present example embodiment includes a liquid supply unit 100, a nozzle 200 and a standing wave generating unit 300.

The liquid supply unit 100 applies a pressure to a liquid for the ejection of the liquid, and thus the liquid supply unit 100 applies the pressure to the liquid stored in a liquid chamber to provide the liquid to the nozzle 200.

The liquid supply unit 100 may include a syringe pump, a pressure control device having a piezoelectric type, and so on. For example, an injection operation and a suction operation are repeatedly performed. In the injection operation, as a step motor operates, a plunger moves forward to push the liquid outwardly. In the suction operation, as the step motor operates reversely, the plunger moves backward to suck in the liquid inwardly. Due to the injection operation and the suction operation, the liquid is repeatedly pressurized toward the nozzle 200.

The nozzle 200 is connected to the liquid supply unit 100 through a connecting conduit 150. The liquid provided from the liquid supply unit 100 passes through a nozzle hole, and in the passing through the nozzle hole, the liquid is formed to be a droplet W. The droplet W is not detached from a nozzle tip 210 and the size of the droplet W is increased until a capillary force Fc and a gravity Fg are in the equilibrium state.

The nozzle 200 is manufactured to have the nozzle hole having a very fine size. For example, the nozzle 200 may include a glass, a metal, Teflon and so on.

The nozzle hole of the nozzle 200 may include a hydrophobic surface. Thus, a surface tension between the liquid and the hydrophobic nozzle hole is decreased and the capillary force Fc is decreased too. Accordingly, a detaching force of the droplet W which is opposite to the capillary force Fc may be decreased and thus the size of the droplet W ejected from the nozzle hole may be more decreased.

The connecting conduit 150 connects the liquid supply unit 100 to the nozzle 200, and may include a flexible polymer tube.

The standing wave generating unit 300 forms a standing wave SW around the nozzle 200, and the detaching force detaching the droplet W from the nozzle 200 is generated by using an acoustic pressure force provided by the standing wave SW.

The standing wave SW is a wave in which a node or a peak of the vibration does not move in a direction of travel of the wave. The standing wave SW is formed by overlapping two waves with each other, when two waves having the same frequency, wavelength and amplitude advance opposite to each other. In addition, in the standing wave SW, two overlapping waves merge with each other, and the points which are always in the same phase and the points which are out of phase are alternately arranged, so that the same motion is always repeated at the same point.

Here, periodic compression and expansion of a medium (an air) occurs at a peak plane on which the points which are always in the same phase and the points which are out of phase are alternately lined up with each other. Then, an acoustic pressure force corresponding to a negative (−) pressure is formed in the compression area of the medium (the air), and an acoustic pressure force corresponding to a positive (+) pressure is formed in the expansion area of the medium (the air).

Thus, when the acoustic pressure force Fa corresponding to the negative (−) pressure is formed in a line with the gravity Fg of the droplet W hanging in the nozzle tip 210, the detaching force Fg+Fa which is the sum of the gravity Fg and the acoustic pressure force Fa is applied to the droplet W, and here, the droplet W is detached from the nozzle tip 210 since the detaching force Fg+Fa is larger than the capillary force Fc.

The nozzle 200 may be formed at any position at which the standing wave SW is formed. For example, the nozzle tip 210 of the nozzle 200 may be formed at the position at which a maximum peak PL of the standing wave SW is formed, and thus the maximum acoustic pressure force Fa may be applied as the detaching force of the droplet W.

Accordingly, the acoustic pressure force Fc may be maximized at the maximum peak PL at which two overlapping waves merge with each other and the points which are always in the same phase and the points which are out of phase are alternately lined up with each other. The nozzle tip 210 is disposed at the position or the height at which the maximum peak PL of the standing wave SW is formed, so that the maximum detaching force for detaching the droplet W may be generated.

The droplet ejection apparatus according to the present example embodiment may further include a heater (not shown) configured to heat the nozzle 200. The heater heats the nozzle 200 to increase a temperature of the liquid passing through the nozzle 200 and to decrease the viscosity of the liquid. Thus, the detaching force of the droplet W detached from the nozzle tip 210 may be decreased, and the size of the droplet W detached from the nozzle tip 210 may be more decreased.

The heater may enclose the nozzle 200, and may include various kinds of heating methods such as convection, heat conduction, electromagnetic induction and so on. In addition, the droplet ejection apparatus may further include a cooler (not shown) cooling the nozzle 200, and the cooler cools the nozzle 200 to decrease the temperature of the liquid and to decrease the viscosity of the liquid, considering the characteristics of the liquid.

In the present example embodiment, the frequency, the wavelength and the amplitude of the standing wave SW may be changed, and thus the intensity of the acoustic pressure force Fa generated in the standing wave SW may be change, so that the size, the ejecting time and the ejecting velocity of the droplet W may be determined arbitrarily.

Hereinafter, the standing wave generating unit in the present example embodiment is explained in detail.

Figure 3A:
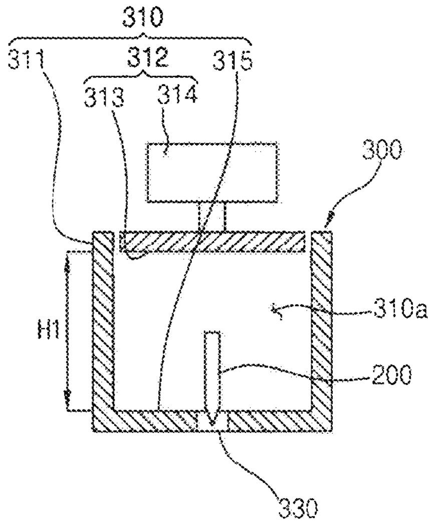
FIG. 3A and FIG. 3B are respectively a front cross-sectional view and a side cross-sectional view illustrating the droplet ejection apparatus of the present example embodiment.
Figure 3B:
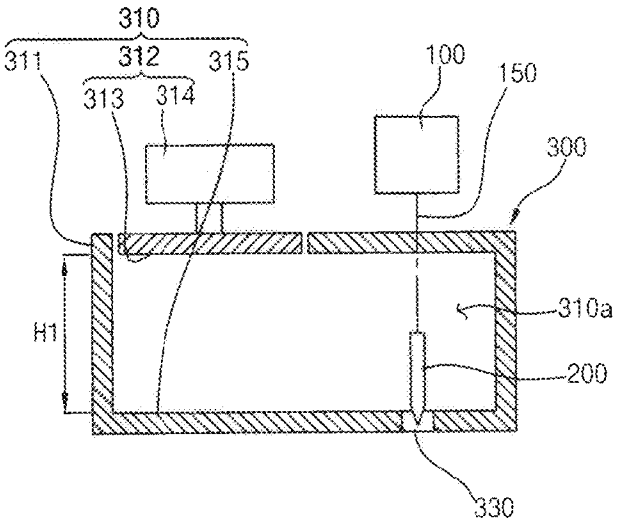

FIG. 3A and FIG. 3B are respectively a front cross-sectional view and a side cross-sectional view illustrating the droplet ejection apparatus of the present example embodiment.

Referring to FIG. 3A and FIG. 3B, in the droplet ejection apparatus according to the present example embodiment, the standing wave generating unit 300 includes a first standing wave generating part 310 and a second standing wave generating part 330.

The first standing wave generating part 310 generates a first standing wave, and is disposed to enclose at least a partial portion of the nozzle 200, to form a first standing wave area 310*a* in which the first standing wave is generated.

The first standing wave generating part 310 includes a first standing wave chamber 311, an acoustic wave generating part 312, an acoustic wave reflecting part 315 and a controller (not shown).

The first standing wave area 310*a* forming the first standing wave is formed inside of the first standing wave chamber 311, and the first standing wave chamber 311 covers at least a portion of the nozzle 200.

Here, as illustrated in FIG. 3A and FIG. 3B, the first standing wave chamber 311 may have a square pillar shape which is a cuboid shape in a whole.

The acoustic wave generating part 312 generates a predetermined frequency, wavelength and amplitude, and the acoustic wave generated from the acoustic wave generating part 312 is dissipated into the first standing wave area 310*a* of the first standing wave chamber 311. For performing the above operation, the acoustic wave generating part 312 includes an acoustic wave dissipating plate 313 and an acoustic wave driving device 314.

The acoustic wave dissipating plate 313 generates the acoustic wave having the frequency, the wavelength and the amplitude, and the frequency, the wavelength and the amplitude of the acoustic wave generated from the acoustic wave dissipating plate 313 are changed by the controller. For example, the acoustic wave dissipating plate 313 may be a piezoelectric transducer, a magnetostrictive transducer and so on.

The acoustic wave driving part 314 dissipates the wave generated from the acoustic wave dissipating part 313 to the first standing wave area 310*a* of the first standing wave chamber 311.

The acoustic driving device 314 forms a portion of the first standing wave chamber, and is disposed on an inner upper surface of the first standing wave chamber 311. Thus, the acoustic wave dissipated through the acoustic driving device 314 is dissipated downwardly from the inner upper surface of the first standing wave chamber 311.

The acoustic wave reflecting part 315 is disposed opposite to the acoustic wave generating part 312. Here, the acoustic wave reflecting part 315 and the acoustic wave generating part 312 may be spaced apart from each other by a first distance HE The acoustic wave reflecting part 315 reflects the acoustic wave dissipated from the acoustic wave generating part 312 in the opposite direction.

The acoustic wave reflecting part 315 forms a portion of the first standing wave chamber 311, and the acoustic wave reflecting part 315 is disposed on an inner lower surface of the first standing wave chamber 311. Thus, the acoustic wave reflected by the acoustic wave reflecting part 315 is reflected upwardly from the inner lower surface of the first standing wave chamber 311.

Thus, the acoustic wave dissipated from the acoustic wave driving device 314, and the reflecting wave reflected by the acoustic wave reflecting part 315 have the same frequency, the same wavelength and the same amplitude, and advance with facing each other to be overlapped with each other, and then form the first standing wave in the first standing wave area 310*a*.

The first distance H1 between the acoustic wave driving device 314 and the acoustic wave reflecting part 315 may be an integer multiple of a half wavelength 212 of the acoustic wave. Thus, at least one peak PL surface may be formed in the first standing wave area 310*a*. Here, two waves overlapped with each other and then the points which are always in the same phase and the points which are out of phase are alternately lined up with each other on the peak PL surface.

As mentioned above, the first distance H1 may be maintained with a distance such as 0.5λ, 1.5λ, 2.5λ, and so on, which is the integer multiple of the half wavelength λ/2. Here, in determining the first distance H1, a calibration interval 0.02λ may be added, and thus, the first distance H1 may be maintained with a distance such as 0.52λ, 1.52λ, 2.52λ, and so on.

The controller controls the acoustic wave dissipating plate 313, controls an On/Off of the acoustic wave dissipating plate 313, and changes the frequency, the wavelength and the amplitude of the acoustic wave.

When the predetermined size of droplet W is formed at the nozzle 200, the controller controls the acoustic wave dissipating plate 313 for the acoustic pressure force Fa of the standing wave to be the maximum peak PL at the same height with the nozzle tip 210. Thus, the ejection time and the ejection velocity of the droplet W may be controlled or determined more precisely and more accurately according to the size of the droplet W ejected.

Figure 4A:
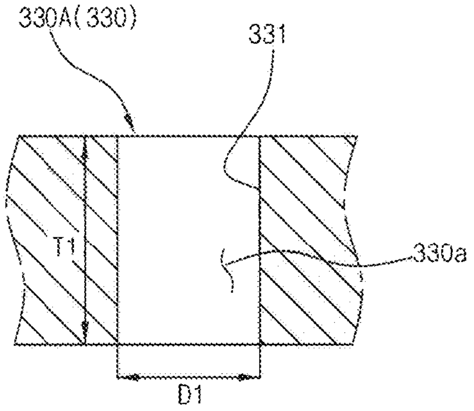
FIG. 4A and FIG. 4B are enlarged views illustrating examples of a second standing wave generating part of FIG. 3A.
Figure 4B:
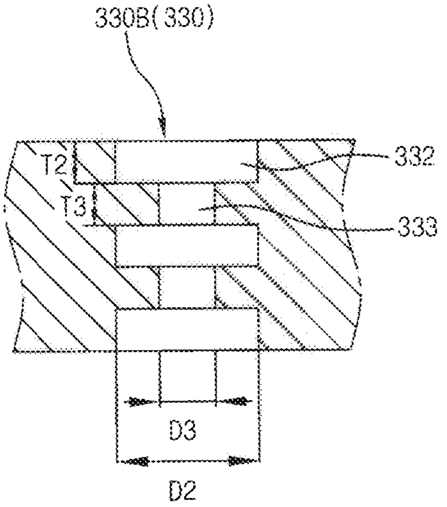

FIG. 4A and FIG. 4B are enlarged views illustrating examples of a second standing wave generating part of FIG. 3A.

Referring to FIG. 4A and FIG. 4B, the second standing wave generating part 330 generates the second standing wave, and is connected to the first standing wave generating part 310. A second standing wave area 330*a* in which the first standing wave from the first standing wave generating part 310 is amplified to be the second standing wave, is formed in the second standing wave generating part 330.

Here, as illustrated in the figures, for example, the second standing wave generating part 330 may be a through hole formed through the first standing wave chamber 311, and here the nozzle tip 210 of the nozzle 200 may be disposed inside of the second standing wave generating part 330.

As illustrated in FIG. 4A, the second standing wave generating part 330A may include a tunnel 331 which is formed through along the ejecting direction of the droplet with respect to the first standing wave chamber 311, and thus the second standing wave may have the natural frequency equal to the first standing wave.

The first standing wave generated from the first standing wave generating part 310 passes through the tunnel 331 of the second standing wave generating part 330A, and the first standing wave resonates and is amplified to be the second standing wave.

Thus, in the second standing wave generating part 330A, the acoustic pressure force is generated larger than that in the first standing wave generating part 310. The nozzle tip 210 is disposed at the second standing wave generating part 330A, so that relatively larger detaching force for detaching the droplet W from the nozzle tip 210 may be generated.

The tunnel 331 may have a first diameter D1 and a first thickness T1, and the first diameter D1 and the first thickness T1 may be changed according to the frequency of the first standing wave. For example, the first thickness T1 may be in a range between 0.01λ and 1λ of the wavelength λ of the first standing wave.

Alternatively, as illustrated in FIG. 4B, the second standing wave generating part 330B may include a tunnel formed through along the ejection direction of the droplet with respect to the first standing wave chamber 311, and the tunnel includes a first tunnel 332 and the second tunnel 333 having diameters different from each other and alternately disposed with each other.

Here, the first tunnel 332 has a second diameter D2 and a second thickness T2, and the second tunnel 333 has a third diameter D3 and a third thickness T3. Here, the second diameter D2 may be larger than the third diameter D3.

The first standing wave generated from the first standing wave generating part 310 passes through the first and second tunnels 332 and 333, and then is amplified to be the second standing wave. The second diameter and thickness D2 and T2 of the first tunnel 332, and the third diameter and thickness D3 and T3 of the second tunnel 333 are properly changed without changing an entire thickness of the tunnel in the second standing wave generating part 330B, and thus various kinds of second standing wave may be generated even though the frequency of the first standing wave generated in the first standing wave generating part 310 is changed.

Figure 5A:
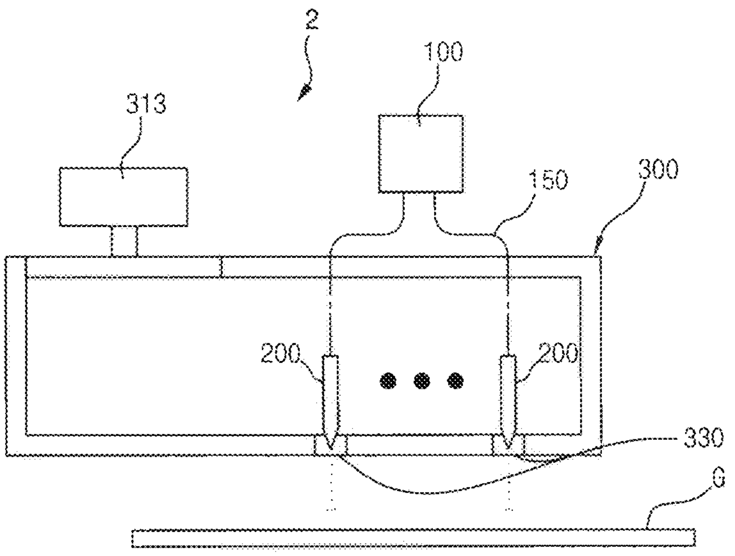
FIG. 5A and FIG. 5B are side cross-sectional views illustrating a droplet ejection apparatus according to another example embodiment of the present invention.
Figure 5B:
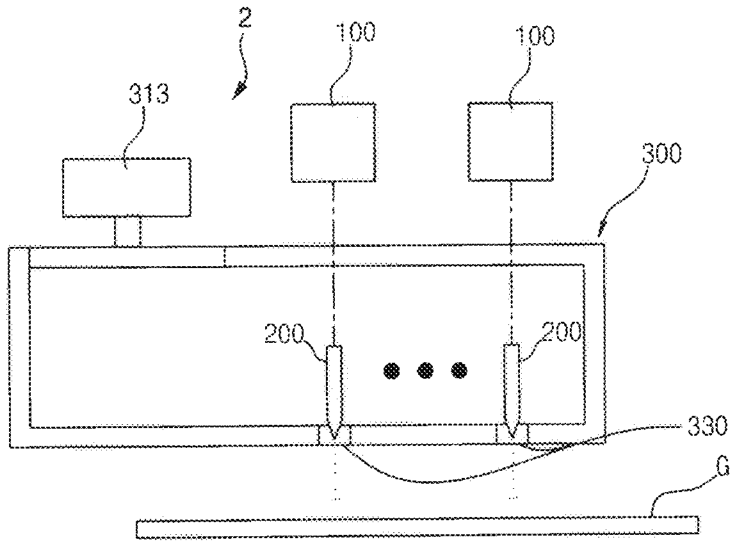

FIG. 5A and FIG. 5B are side cross-sectional views illustrating a droplet ejection apparatus according to another example embodiment of the present invention.

The droplet ejection apparatus 2 according to the present example embodiment is substantially same as the droplet ejection apparatus 1 according to the previous example embodiment in FIG. 2A to FIG. 4B, except that a plurality of nozzles 200 is disposed with a predetermined distance, and thus same reference numerals are used for the same elements and any repetitive explanation will be omitted.

Referring to FIG. 5A and FIG. 5B, in the droplet ejection apparatus 2 according to the present example embodiment, the plurality of the nozzles 200 is arranged. Thus, a plurality of second standing wave generating parts 330 is also configured with the predetermined same distance in the first standing wave chamber 310, so that the second standing wave generating parts 330 may be respectively disposed at the nozzles 200.

The standing wave generated from the first standing wave generating part 310 in the first standing wave chamber 310 is introduced into each of the second standing wave generating parts 330 and is amplified, and then the acoustic pressure force is provided to detach the droplet W from each of the nozzles 200.

Here, as illustrated in FIG. 5A, a single liquid supply unit 100 may be configured to apply the same pressure to each of the nozzles 200 for supplying the liquid, or may supply the same material of liquid to each of the nozzles 200.

Alternatively, as illustrated in FIG. 5B, a plurality of liquid supply units 100 may be connected to the nozzles 200 respectively and independently, and then the pressures applied to the nozzles may be different from each other, or the materials of the liquid applied to the nozzles may be also different from each other.

In the present example embodiment, since the plurality of the nozzles 100 is disposed with the predetermined distance and the plurality of the second standing wave generating parts 330 is necessary, so that the first standing wave area 310*a* formed by the first standing wave generating part 310 may be larger than that in the droplet ejection apparatus 1 explained above referring to FIG. 2A to FIG. 4B.

Figure 6A:
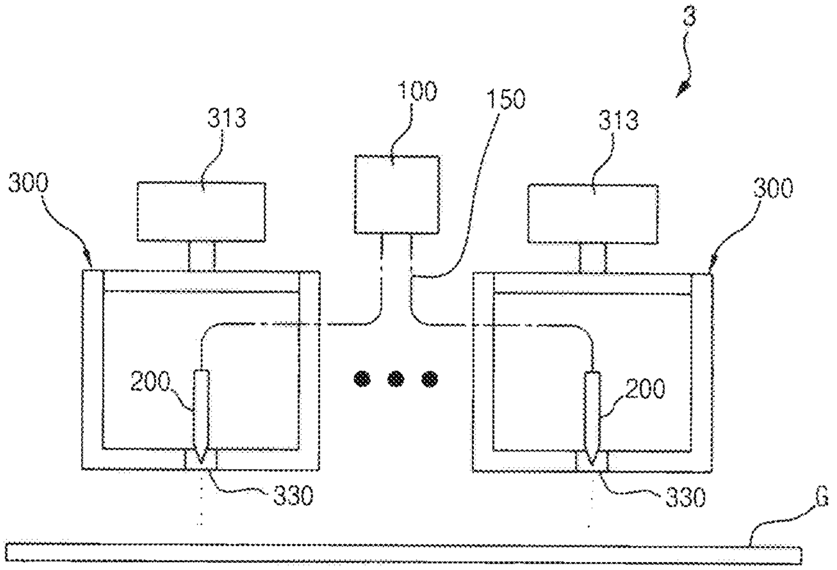
FIG. 6A and FIG. 6B are side cross-sectional views illustrating a droplet ejection apparatus according to still another example embodiment of the present invention.
Figure 6B:
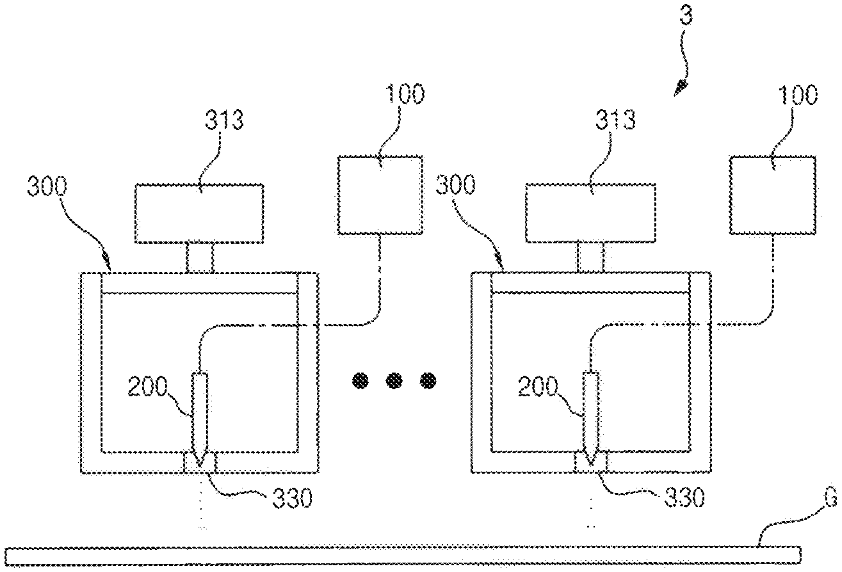

FIG. 6A and FIG. 6B are side cross-sectional views illustrating a droplet ejection apparatus according to still another example embodiment of the present invention.

The droplet ejection apparatus 3 according to the present example embodiment is substantially same as the droplet ejection apparatus 1 according to the previous example embodiment in FIG. 2A to FIG. 4B, except that a plurality of nozzles 100 is disposed with a predetermined distance and a plurality of standing wave generating units 300 is disposed with a predetermined distance, and thus same reference numerals are used for the same elements and any repetitive explanation will be omitted.

Referring to FIG. 6A and FIG. 6B, in the droplet ejection apparatus 3 according to the present example embodiment, the plurality of the nozzles 100 is arranged, and the plurality of the standing wave generating units 300 is arranged. Thus, using the standing wave independently generated from the plurality of the standing wave generating unit 300, the acoustic pressure force detaching the droplet W from each of the nozzles 200 is independently provided.

Here, as illustrated in FIG. 6A, a single liquid supply unit 100 may be configured to apply the same pressure to each of the nozzles 200 for supplying the liquid, or may supply the same material of liquid to each of the nozzles 200.

Alternatively, as illustrated in FIG. 6B, a plurality of liquid supply units 100 may be connected to the nozzles 200 respectively and independently, and then the pressures applied to the nozzles may be different from each other, or the materials of the liquid applied to the nozzles may be also different from each other.

Accordingly, the pressure of the liquid by the liquid supply unit 100 and the acoustic pressure force by the standing wave generating unit 300 are independently controlled, so that the size and the ejection time of the droplet W ejected from each of the nozzles 200 may be controlled independently. Thus, the printing efficiency for a substrate G may be more increased.

Here, as illustrated in FIG. 6A and FIG. 6B, when the nozzles 200 and the standing wave generating units 300 are plural, the plurality of the standing wave generating units 300 may be connected to each other through a position control unit (not shown). In addition, the distance between the plurality of the standing wave generating units 300 may be properly controlled by the position control unit.

Hereinafter, a droplet ejection method is explained referring to FIG. 2A to FIG. 3B again.

The droplet ejection method includes a droplet forming step (step S10), and a droplet detaching step (step S20).

In the droplet forming step (step S10), the liquid is pressurized by the liquid supply unit 100, and then the droplet is hanged at the nozzle tip 210 of the nozzle 200.

The liquid pressurized by the liquid supply unit 100 passes through the nozzle 200, and in the passing through the nozzle, the liquid is formed to be the droplet W at the nozzle tip 210. The droplet W is not detached from the nozzle tip 210 and the size of the droplet W is increased until the capillary force Fc and the gravity Fg are in the equilibrium state.

Then, in the droplet detaching step (step S20), the droplet W is detached from the nozzle tip 210 using the acoustic pressure force of the standing wave generated from the standing wave generating unit 300.

When the size of the droplet W formed at the nozzle tip 210 is increased to be the predetermined size, the standing wave SW is generated from the standing wave generating unit 300. In addition, when the acoustic pressure force Fa corresponding to the negative (−) pressure of the standing wave SW is formed in a line with the gravity Fg of the droplet W hanging in the nozzle tip 210, the detaching force Fg+Fa which is the sum of the gravity Fg and the acoustic pressure force Fa is applied to the droplet W, and here, the droplet W is detached from the nozzle tip 210 as the detaching force Fg+Fa is larger than the capillary force Fc.

In the droplet detaching step (step S20), the controller (not shown) controlling the acoustic wave dissipating plate 313 of the first standing wave generating part 310 may controls the size, the ejection time and the ejection velocity of the droplet W.

When the size of the droplet W is increased to be the predetermined size at the nozzle tip 210, the controller controls the acoustic wave dissipating plate 313 for the acoustic pressure force Fa of the standing wave to be the maximum peak PL at the same height with the nozzle tip 210.

Thus, the size, the ejection time and the ejection velocity of the droplet W ejected from the nozzle 200 may be arbitrarily determined, and the precise and accurate ejection control may be performed.

Figure 7A:
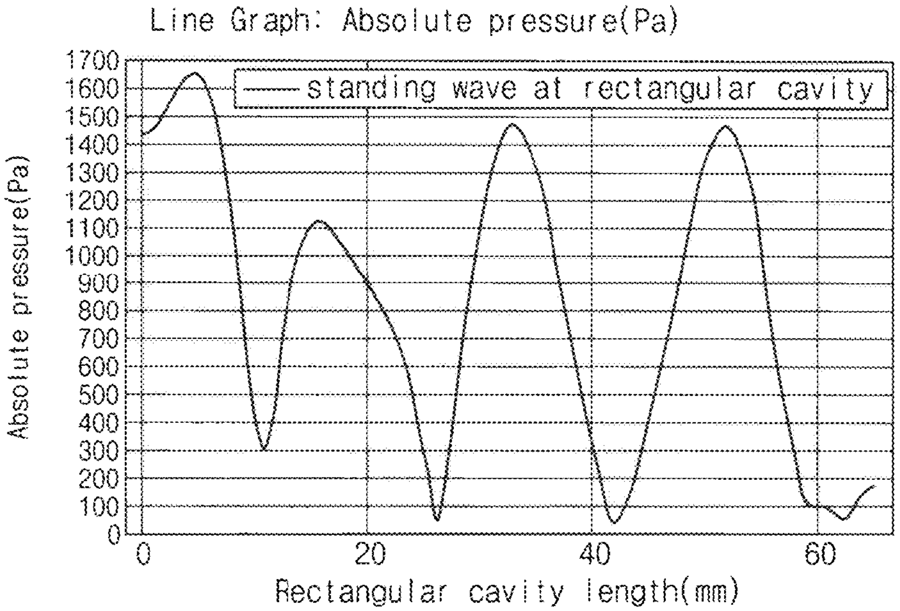
FIG. 7A is a simulated result showing a wave form and a size of the acoustic pressure of the first standing wave generated from the first standing wave generating part in FIG. 3A and FIG. 3B.
Figure 7B:
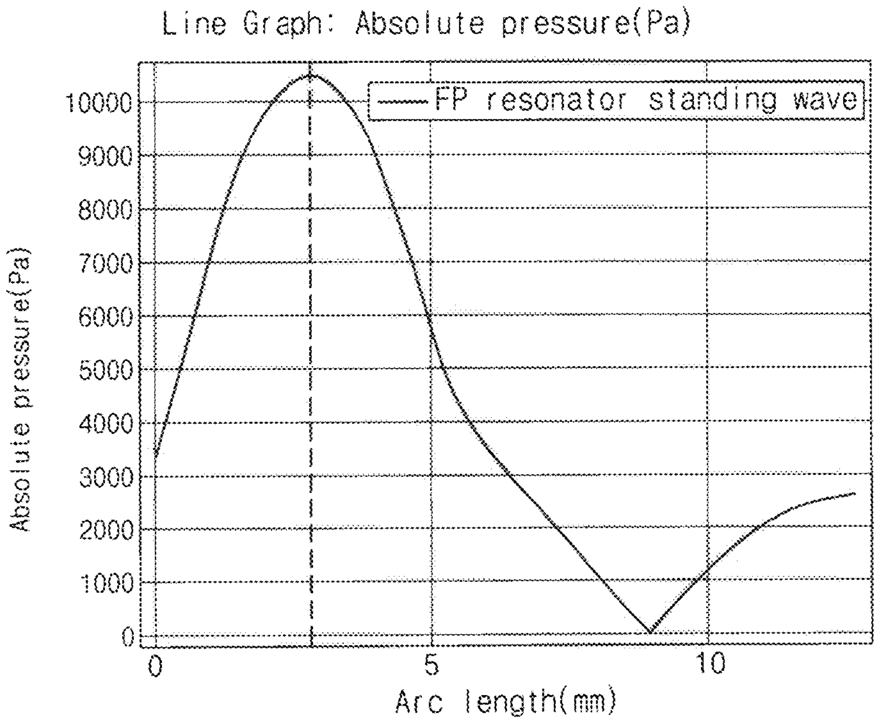
FIG. 7B is a simulated result showing a wave form and a size of the acoustic pressure of a second standing wave generated from a second standing wave generating part as the first standing wave is provided.

FIG. 7A is a simulated result showing a wave form and a size of the acoustic pressure of the first standing wave generated from the first standing wave generating part in FIG. 3A and FIG. 3B, and FIG. 7B is a simulated result showing a wave form and a size of the acoustic pressure of a second standing wave generated from a second standing wave generating part as the first standing wave is provided.

Referring to FIG. 7A, the first standing wave has a wave similar to a sinusoidal wave, along a longitudinal direction of a rectangular frame space (X axis, rectangular cavity length) which is formed by the first standing wave area 310*a* via the first standing wave generating part 310. A magnitude of the acoustic pressure force (Y axis, absolute pressure) of the first standing wave is in a range between about 0 Pa and about 1,700 Pa.

Referring to FIG. 7B, in cases that the first standing wave is generated, the second standing wave generated in the second standing wave generating part 330 forms the acoustic pressure force over about 10,000 Pa at a specific position A along the longitudinal direction (X axis, arch length) of the second standing wave area 330*a* in the second standing wave generating part 330.

Accordingly, using the droplet ejection apparatuses according the present example embodiments, the first standing wave is amplified to be the second standing wave forming the acoustic pressure force amplified more than 7 times.

Thus, by the above effective amplification of the acoustic pressure force, the droplet may be ejected more effectively. In addition, the liquid having relatively higher viscosity may be detached and ejected more efficiently.

Accordingly, the droplet ejection apparatus and the droplet ejection method using the droplet ejection apparatus may be applied to a dispenser capable of dispensing high viscous liquid, for example, non-toxic, conductive, low-melting alloys such as gallium-indium, biological solutions and so on.

In addition, the droplet ejection apparatus and the droplet ejection method using the droplet ejection apparatus may be very useful for applications in various printing fields, such as complex fluids, novel micro and nano fluid technologies, and printing energy harvesting and sensing technologies, and may be also be applied to a wide range of biological applications such as wearables, implantable diagnostics, and biosynthetic orang printing.

Further, the droplet ejection apparatus and the droplet ejection method using the droplet ejection apparatus may have great advantages in 3D printing fields such as nano and bio, wherein relatively high viscosity is applied. For example, in the case of a high viscosity cell solution used in the bio field, the solution may be ejected with minimizing contamination. In addition, a highly viscous reactive solution having a conductivity equivalent to that of silver used in the field of microelectronic component manufacturing may be effectively printed by a drop on demand (DOD) method.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A droplet ejection apparatus comprising:

a liquid supply unit configured to provide a pressure to a liquid;

a nozzle connected to the liquid supply unit through a connecting conduit, to eject the liquid with a droplet; and a standing wave generating unit configured to generate a standing wave around the nozzle at which the droplet is formed, to detach the droplet from the nozzle, wherein the standing wave generating unit comprises, a first standing wave generating part covering at least a partial portion of the nozzle and configured to form a first standing wave area in which a first standing wave is formed, and a second standing wave generating part connected to the first standing wave generating part, configured to amplify the first standing wave generated from the first standing wave generating part, and configured to form a second standing wave area in which a second standing wave is formed, the second standing wave generating part comprises a tunnel defined through a first standing wave chamber of the first standing wave generating part, wherein the tunnel comprises, a first tunnel connected to the first standing wave area, and a second tunnel connected to the first tunnel, wherein the first tunnel and the second tunnel are alternately disposed with each other, wherein the first tunnel has a first diameter and a first thickness, and the second tunnel has a second diameter smaller than the first diameter and a second thickness, respectively, and wherein the first diameter and the first thickness and the second diameter and the second thickness are properly changed without changing an entire thickness of the tunnel in the second standing wave generating part.

2. The droplet ejection apparatus of claim 1, wherein a nozzle tip of the nozzle is disposed in the second standing wave area.

3. The droplet ejection apparatus of claim 2, wherein the nozzle tip is disposed at a position substantially same position at which a peak having a maximum acoustic pressure force of the second standing wave is formed.

4. The droplet ejection apparatus of claim 2, wherein the standing wave generating unit further comprises:

a controller configured to control the first standing wave generating part so as for a peak having a maximum acoustic pressure force of the second standing wave to be at a same position of the nozzle tip, when a predetermined size of droplet is formed at the nozzle.

5. The droplet ejection apparatus of claim 1, wherein the first standing wave generating part comprises:

the first standing wave chamber configured to form the first standing wave area;

an acoustic wave generating part configured to generate an acoustic wave to be dissipated into the first standing wave area; and an acoustic wave reflecting part spaced apart from the acoustic wave generating part by a first distance, to reflect the acoustic wave dissipated from the acoustic wave generating part.

6. The droplet ejection apparatus of claim 5, wherein the first standing wave chamber has a square pillar shape.

7. The droplet ejection apparatus of claim 5, wherein the first distance is an integer multiple of a half wavelength $\lambda/2$ of the acoustic wave.

8. The droplet ejection apparatus of claim 5, wherein the second standing wave generating part is configured to have a natural frequency equal to a frequency of the first standing wave.

9. The droplet ejection apparatus of claim 1, wherein at least one of the nozzle and the standing wave generating unit is a plural with keeping a predetermined distance.

10. The droplet ejection apparatus of claim 9, wherein the nozzle includes a plurality of nozzles, and the liquid supply unit is configured to supply the liquid toward each of the nozzles with a same pressure or to supply the liquid at different pressures toward respective ones of the nozzles.

11. The droplet ejection apparatus of claim 1, further comprising:

a heater configured to heat the nozzle so as to decrease viscosity of the liquid passing through the nozzle.

12. A droplet ejection method using the droplet ejection apparatus of claim 1, the method comprising:

pressurizing the liquid by the liquid supply unit and forming the droplet at the nozzle; and detaching the droplet from the nozzle using an acoustic pressure force of the standing wave generated by the standing wave generating unit.

13. The method of claim 12, wherein the pressurizing the liquid by the liquid supply unit and the forming the droplet at the nozzle includes controlling the standing wave generating unit such that a peak having a maximum acoustic pressure force of the standing wave is formed at a same position as a nozzle tip, when a predetermined size of the droplet is formed at the nozzle.

* * * * *